United States Patent [19]

Kanao

[11] Patent Number: 4,830,694

[45] Date of Patent: May 16, 1989

[54] METHOD OF MANUFACTURING PRESSURE WITHSTANDING PIPE

[76] Inventor: Shiro Kanao, No. 9-18, Nanpeidai 4-chome, Takatsuki-shi, Osaka, Japan

[21] Appl. No.: 38,180

[22] Filed: Apr. 14, 1987

Related U.S. Application Data

[62] Division of Ser. No. 896,147, Aug. 13, 1986, Pat. No. 4,796,672.

[30] Foreign Application Priority Data

Dec. 12, 1985 [JP] Japan ................................ 60-280082

[51] Int. Cl.$^4$ ............................................. F16L 11/08
[52] U.S. Cl. ..................................... 156/143; 156/184; 156/244.13; 264/209.3; 264/210.1; 138/129; 138/174
[58] Field of Search ............... 156/143, 144, 184, 243, 156/244.13; 264/210.1, 209.3; 138/129, 132, 133, 138, 144, 174

[56] References Cited

U.S. PATENT DOCUMENTS 3,230,127 1/1966 Cleereman et al. .................. 156/243
3,945,867 3/1976 Heller, Jr. et al. .................. 156/143
4,587,145 5/1986 Kanao .............................. 138/132 X
4,613,389 9/1986 Tanaka ............................ 138/122 X Primary Examiner—Michael W. Ball
Assistant Examiner—Jeff H. Aftergut
Attorney, Agent, or Firm—Sughrue, Mion, Zinn, Macpeak & Seas

[57] ABSTRACT

An improved pressure-withstanding pipe according to the invention is made of a soft synthetic resin or rubber material with hard synthetic resin reinforcing bodies helically wound and embedded in the pipe wall at predetermined intervals. A thin reinforcing belt member is also helically wound and embedded in the pipe wall and the opposite side end portions of the belt are anchored in adjacent ones of the rigid reinforcing bodies. The method of manufacturing a pipe according to the invention includes a step of extruding the pipe forming body by feeding rigid synthetic reinforcing material and soft synthetic material to the extruder and, at the same time, passing the thin reinforcing belt member therethrough. The resultant pipe according to the invention is highly resistant to extension and other deformation due to pressure exerted from the material being transported as well as highly resistant to external pressure and deformation from such pressure.

16 Claims, 4 Drawing Sheets

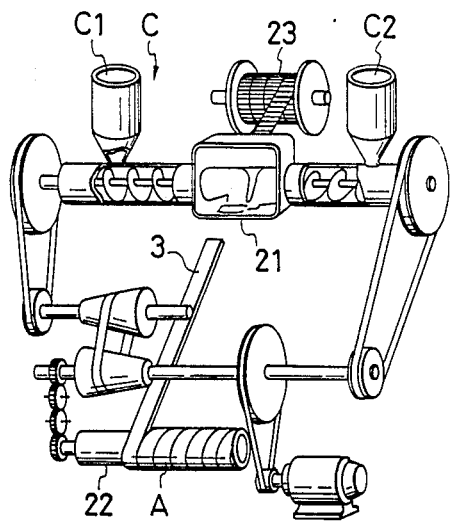
FIG. 5
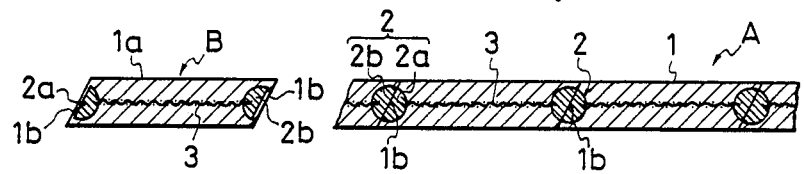
FIG. 6    FIG. 7
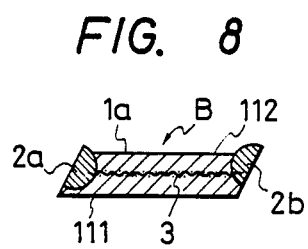
FIG. 8    FIG. 9
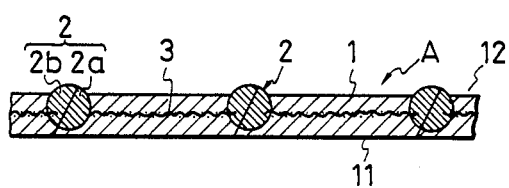
FIG. 10    FIG. 11
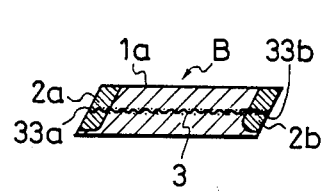

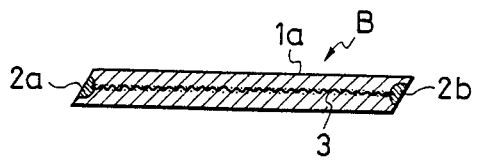
FIG. 12
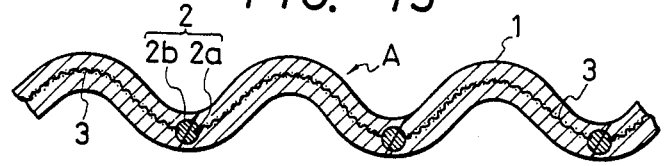
FIG. 13
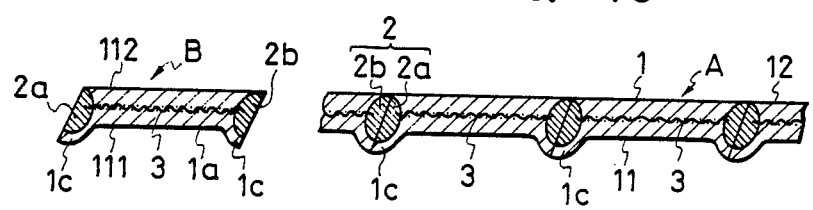
FIG. 14      FIG. 15
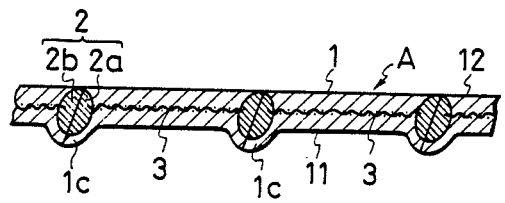
FIG. 16
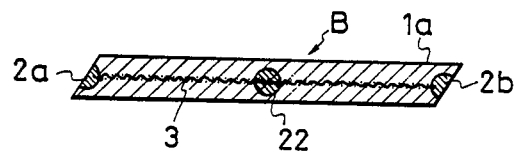
FIG. 17
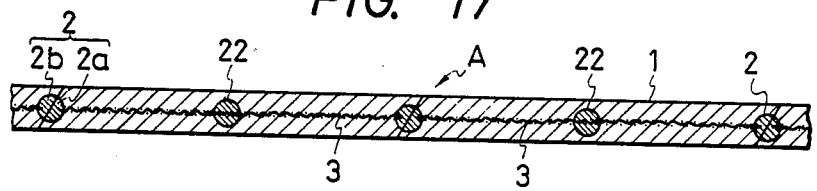
FIG. 18
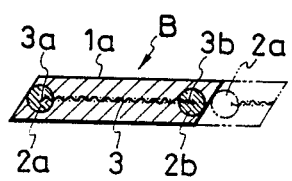

METHOD OF MANUFACTURING PRESSURE WITHSTANDING PIPE

This is a division of application Ser. No. 896,147 filed Aug. 13, 1986, now U.S. Pat. No. 4,796,672.

BACKGROUND OF THE INVENTION

The present invention relates to pipes suitable for pneumatic transportation, or the like. The material to be transported may be mainly a liquid such as water, oil, liquid chemicals, or the like, a gaseous body such as air, gas, or the like, agricultural products such as grain, corn, or the like, or waste materials in a factory, or the like. The present invention relates particularly to pipes which have superior pressure-withstanding properties and which are suitable for the transportation of a liquid, gaseous body, grain, or the like, which produces a high pressure in the pipes. The present invention also relates to a method for manufacturing such pipes.

Conventionally, a pressure-withstanding pipe has a pipe wall with a main portion thereof made of a soft synthetic resin material. In addition, reinforcing filaments made of a hard synthetic resin material or reinforcing wires made of metal are helically embedded in the pipe wall as a reinforcing body. Such a pipe is known and manufactured. Further, a pipe of this kind having a large number of natural fiber filaments, metal wires, or the like, further embedded and arranged in parallel to each other and disposed all over the circumferential surface of the pipe wall is also known.

A pipe in which a fiber reinforcing belt is embedded in the pipe wall by using cloth in place of the fiber filaments or wires in the pipe mentioned directly above also is known.

Further, it is possible to consider a method of manufacturing a pipe (OA) in which a fiber reinforcing belt is embedded in the pipe wall in addition to such reinforcing filaments as shown in FIG. 19, for example. In this method, a belt body (01a), which is made of a soft synthetic resin material and in which hard synthetic resin reinforcing filaments (02) are embedded, is extruded from a synthetic resin extruder and helically wound, with adjacent windings being joined by fusing adjacent edge portions with each other; then a fiber cloth reinforcing belt (03) is helically wound on the outer circumferential surface of the belt body (01a) at the same pitch as that of the belt body (01a) while partially overlapping or abutting adjacent edge portions of the reinforcing belt (03); and then a soft synthetic resin flat belt body (01b) formed by being extruded by another synthetic resin extruder is helically wound on the outer surface of the reinforcing belt (03) at the same pitch as that of the belt body 01a. Again, as the belt body (01b) is wound, the end portions of adjacent windings are joined with each other by fusing.

In the case of employing such a method, however, complicated mechanical equipment is required as there are three winding operations. In addition, the produced pipe (OA) is disadvantageous in that the position where the soft reinforcing filaments (02) are embedded becomes thick and it is difficult for the embedded fiber reinforcing belt (03) to be firmly maintained in the pipe wall, particularly at the overlapped portion (or the abutted portion) of the side edge portions thereof. Therefore, the embedding state of the belt (03) is apt to become unstable. Further, particularly in the case where the pipe is used for transporting a liquid or the like providing a high pressure in the pipe, the overlapped portion (or the abutted portion) located between the inner and outer soft belt bodies (01a) and (01b) is apt to cause a peeling phenomenon between the belt bodies. This peeling phenomenon is due to an expansion action exerted in the circumferential or radial direction of the pipe and an extension action exerted in the longitudinal or axial direction of the pipe due to pressure exerted on the pipe by the transported material in a radial and an axial direction, respectively. The peeling phenomenon can also be caused by tensile stresses which may be created when the pipe is placed in a curved state. In addition, the overlapping portion of the fiber reinforcing belt (03) is apt to slide upon generation of the extension action of the pipe so as to prevent the extension phenomenon of the pipe.

SUMMARY OF THE INVENTION

An object of the present invention is therefore to provide a pressure-withstanding pipe in which all the above-mentioned disadvantages are eliminated even where the pipe is provided with a reinforcing body and a reinforcing belt body in its pipe wall.

Specifically, an object of the invention is to achieve a pipe which has a high resistance to pressure exerted from within as well as without the pipe body.

A further object of the invention is to achieve a pipe which is resistant to the peeling phenomenon and sliding phenomenon mentioned above.

Another object of the invention is to achieve a pipe which is easy to manufacture, low in cost and lightweight.

The invention is an improved pressure-withstanding pipe and a method of manufacturing such a pipe. The improved pipe includes a pipe body having rigid reinforcing bodies and a soft reinforcing thin film embedded in the pipe body. The rigid reinforcing bodies are spaced at predetermined intervals. Opposite side end portions of the soft reinforcing thin film are embedded in adjacent ones of the rigid reinforcing bodies such that the reinforcing thin film lies between the adjacent ones of the rigid reinforcing bodies and has its opposite side end portions firmly anchored therein.

The method of forming an improved pipe according to the invention involves the steps of: extruding a pipe forming belt body or roll by feeding rigid reinforcing material and soft synthetic material to an extruder and at the same time passing a continuous band of a thin reinforcing belt material therethrough; helically winding the pipe forming belt body around a pipe forming shaft such that adjacent edge portions of the belt body are abutted or overlapped; and fusing the adjacent edge portions of the belt body.

The resultant pipe has superior structure and pressure-withstanding characteristics. It is also simple to manufacture and low in cost.

BRIEF DESCRIPTION OF THE DRAWINGS

The above-mentioned objects, advantages and features of the invention as well as other objects, advantages and features of the invention will become more evident with reference to the detailed description of the preferred embodiments herein and with reference to the accompanying drawings in which:

FIG. 5 is a schematic and explanatory view of a device for manufacturing a pipe according to the invention;

FIGS. 6, 8, 10, 12, 14 and 16 are each cross-sectional views of a belt body of various respective embodiments of the invention;

FIGS. 7, 9, 11, 13, 15 and 17 are each cross-sectional views of a respective pipe wall formed from the respective belt bodies of FIGS. 6, 8, 10, 12, 14 and 16;

FIG. 18 is a cross-sectional view of a pipe forming belt body according to another embodiment of the invention;

DETAILED DESCRIPTION OF THE INVENTION

Figure 1:
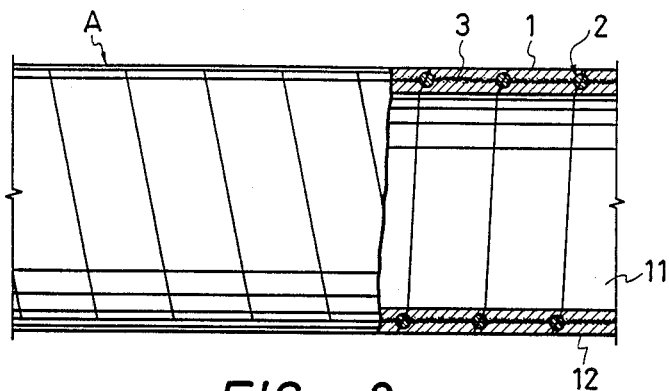
FIG. 1 is a partially cut away view of an embodiment of a pipe according to the invention.
Figure 2:
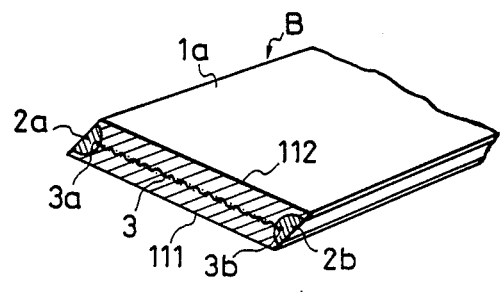
FIG. 2 is a perspective view of a pipe forming belt body for forming the pipe shown in FIG. 1.

Referring to FIGS. 1 through 4, there is shown a pressure-withstanding pipe according to a first embodiment of the invention. The pipe is made of a soft synthetic resin material or a rubber material 1a and provided with hard synthetic resin reinforcing bodies 2 helically embedded at positions so as to be concealed by at least an inner surface 11 of a pipe wall 1 of the pipe A. The resin reinforcing bodies 2 are disposed at a predetermined interval from each other, and a thin film reinforcing belt member 3 is embedded in the pipe wall 1 at a position between adjacent ones of the hard synthetic resin reinforcing bodies 2. With reference to FIG. 2 in particular, left and right opposite end portions 3a and 3b, respectively, of the thin film reinforcing belt member 3 are embedded in left and right hard synthetic resin reinforcing body halves 2a and 2b, respectively.

Referring to FIGS. 1 through 5, the method of manufacturing a pressure-withstanding pipe will now be described. A pipe forming belt body B is continuously extruded through an extruding opening 21 of an extruding molding machine C. The belt body B is made of a soft synthetic resin material or a rubber material 1a and is extruded such that is has a predetermined width and a cross-section which is elongated in a direction which would be parallel to the axial direction of the finished pipe. Further, the extrusion of the pipe forming belt body is such that left and right rigid synthetic resin reinforcing body halves 2a and 2b of a hard resin reinforcing material 1b are disposed at a predetermined pitch and at positions in the belt body B so as to be concealed by at least a bottom surface 111 of the material 1a and so as to be close to left and right opposite end portions (3a,3b) of the material 1a, respectively. In addition, a reinforcing belt member 3 is passed through the extruder at the same time as the soft and hard resin materials such that the belt member 3 is embedded in the soft resin material 1a at a position between the left and right reinforcing body halves 2a and 2b. The left and right opposite end portions 3a and 3b of the thin film reinforcing belt member 3 are embedded in the left and right rigid synthetic resin reinforcing body halves 2a and 2b, respectively. The extruded belt body B is then successively guided and helically wound onto a pipe forming body or shaft 22 such that the bottom surface 111 which conceals the rigid synthetic resin reinforcing body halves 2a and 2b is made to correspond to the inner surface side 11 of the resultant pipe A. It should be noted that the pipe forming belt body B could be wound such that the top surface 112 corresponds to the inner surface side 11 of the pipe A, if the rigid synthetic resin reinforcing body halves 2a and 2b are concealed at the top surface 112. While the pipe forming belt body B is helically wound, adjacent of left and right edge portions of adjacent windings of the belt body B are abutted against each other or overlapped with each other. The adjacent edge portions of adjacent windings of the belt body 3 are then fixed to each other to connect the windings integrally.

The thin film reinforcing belt member 3 is entirely embedded in the soft synthetic resin or rubber material 1a in manufacturing the pipe forming belt body B so that the belt body B has a good stability, in that the thin film reinforcing belt member 3 is positioned in the state where the opposite end portions 3a and 3b thereof are entirely embedded in the rigid synthetic resin reinforcing bodies 2 and are surely, firmly, and extremely stably held by the reinforcing bodies 2. The opposite side end portions 3a and 3b are thereby prevented from coming out of the rigid synthetic resin reinforcing bodies 2 even when the pipe experiences extension in the longitudinal direction due to inner pressure. The opposite side end portions 3a and 3b are also embedded in adjacent ones of the reinforcing bodies 2 so as to maintain the adjacent ones of the rigid synthetic resin reinforcing bodies 2 at a predetermined interval and thereby prevent the pipe from being extended excessively. Further, in manufacturing the pipe A, the pipe A can be integrally formed by merely winding the pipe forming belt body as formed according to the above process due to the unitary belt body structure.

Referring to the drawings, preferred embodiments according to the present invention will now be described in more detail.

Figure 3:
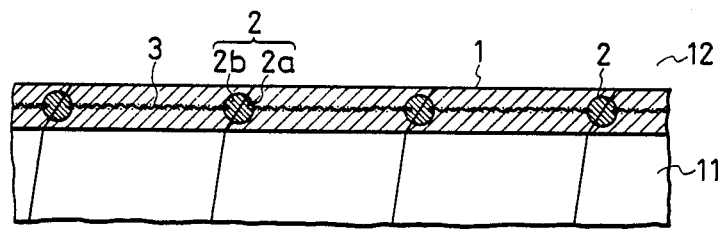
FIG. 3 is an enlarged, cross-sectional view of a pipe wall of the pipe shown in FIG. 1.

FIGS. 1 through 3 are views showing the structure of an embodiment of the pressure-withstanding pipe; FIG. 5 is a schematic view showing an example of the device for manufacturing a belt body B with which the pressure-withstanding pipe A shown in FIGS. 1 through 3 is produced; and FIG. 4 is a view showing a natural fiber cloth belt member as an example of the thin film reinforcing belt member 3.

Figure 4:
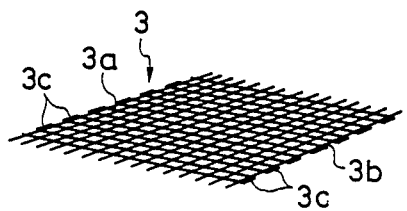
FIG. 4 is a perspective view of a reinforcing belt member of a type which can be used in a pipe according to the invention.

In FIG. 5, the reference numeral C1 designates a hopper for feeding a soft synthetic resin material 1a therethrough, C2 a hopper for feeding a hard or rigid synthetic resin material 1b therethrough, and 23 a drum around which the natural fiber cloth belt member 3 shown in FIG. 4 is wound. The soft synthetic resin material 1a, the rigid synthetic resin material 1b and the cloth belt member 3 are integrally extruded in the form of a belt from an extruding opening 21. As shown in FIG. 2, the resultant extruded belt body B is arranged such that the cross-section thereof is elongated toward the left and right ends thereof, so as to be shaped, for example, in the form of an elongated parallelogram. The main portion of the belt body B is made of the soft synthetic resin material 1a. The left and right rigid synthetic resin reinforcing body halves 2a and 2b, each having a semi-circular cross-section, are embedded in the soft synthetic resin material 1a at the left and right ends of the material 1a such that the respective flat, cut end surfaces of the left and right hard synthetic resin reinforcing body halves 2a and 2b are exposed at the left and right outer end surfaces of the material 1a. The exposed cut end surface of the reinforcing body halves 2a and 2b are positioned at depths intermediate of the bottom and top surfaces 111 and 112, respectively, of the belt body B which correspond to the inner and outer surfaces 11 and 12, respectively, of the pipe wall 1, as shown in FIGS. 1–3.

The natural fiber cloth belt member 3 serves as a thin film reinforcing belt member in the soft resin material 1a of the belt body B and is embedded therein between the reinforcing body halves 2a and 2b with the opposite side end portions 3a and 3b of the cloth belt member 3 embedded in the rigid resin reinforcing body halves 2a and 2b, respectively. In this case, if the belt member is a narrow cloth belt member 3, rather than that obtained by cutting wide cloth, and the belt member 3 has woof woven-back portions 3c at the opposite sides 3a and 3b thereof, as shown in FIG. 4, the woven-back portions 3c function in the hard resin reinforcing body halves 2a and 2b, so that the belt member 3 is more securely and effectively held by the hard resin reinforcing body halves 2a and 2b.

The thus arranged belt body B is continuously extruded from the extruding opening 21. Immediately after being extruded, such that adjacent of the left and right end portions of the belt body B are still soft, the belt body B is guided onto a pipe forming body or shaft 22 of a pipe forming machine, as shown in FIG. 5 for example. The belt body B is then successively wound around the shaft 22 such that the adjacent of the left and right edge portions of the belt body B contact each other. While the belt body B is being wound around the shaft 22, the contacting adjacent edge portions of the belt body B are fused to each other so that the wound belt body B is serially integrally connected, as shown in FIG. 3, to thereby produce such a pressure-withstanding pipe A as shown in FIG. 1. If the steps of helically winding and fusing are performed after the left and right edge portions of the belt body B have substantially hardened, the step of fusing may include heating of the left and right edge portions of the belt body B such that the edge portions are softened.

As the synthetic resin material according to the present invention, a synthetic resin material in a group of vinyl chloride or a synthetic resin material such as polyethylene, polypropylene, or the like, in a group of polyolefine is mainly used for both the hard and soft materials from the viewpoint that they are superior in economical property, weather-proof, and the like, but any other synthetic resin may be used. Further, to achieve good affinity between the soft and hard synthetic resin materials, it is preferable to use synthetic resin materials in the same group for the soft and hard synthetic resin materials. In addition, as the material for forming a main portion of the belt body B according to the present invention, that is, the pipe wall 1 of the pressure-withstanding pipe A, not only a soft synthetic resin material but also a material in a group of synthetic or natural rubber can be used.

Further, in the above-mentioned embodiment, particularly as shown in FIG. 2, in the case where the hard or rigid synthetic resin reinforcing body halves 2a and 2b are formed so as to be exposed at the left and right edge surfaces of the belt body B, it is desirable to use a hard synthetic resin material which per se has good fusibility, for example, a resin material from the above-mentioned group of polyethylene, or the like.

Further, there are synthetic resin materials which have poor fusibility when existing in a hard synthetic resin material state, and therefore in the case where, for example, a hard synthetic material in a group of vinyl chloride is used, the belt member B is formed to have such an arrangement that one or both of the hard resin reinforcing body halves 2a and 2b are embedded without being exposed at the left and right side surfaces of the belt body B such that the soft synthetic resin material 1b exists on the cut or flat surface side of the rigid resin reinforcing body halves 2a and 2b, as shown in FIG. 6. Thus, it is possible to obtain such a pipe A in which the soft synthetic resin material 1b exists between the hard resin reinforcing body halves 2a and 2b so that the adjacent left and right edges of adjacent windings of the belt body B (which correspond to left and right side surfaces of the belt body B, respectively) are securely joined by fusing all over the adjacent edges thereof. A cross-sectional view of a pipe wall 1 formed using the belt body of FIG. 6 is shown in FIG. 7.

As the thin film reinforcing belt member 3 according to the present invention, in addition to the natural fiber cloth belt member as shown in the above-mentioned embodiment, synthetic resin fiber, glass fiber, carbon fiber, and the like, which have poor fusibility, that is, which can be fused at a high temperature, may be used as a fibrous material for the belt member. These materials may be used alone or in any combination thereof, and the fibrous kind may be either a multi-filament material or a mono-filament material.

Figure 20:
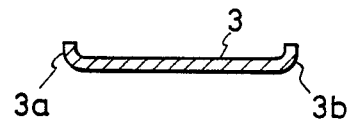
FIGS. 20-22 are respective cross-sectional views of reinforcing belt members of different types which can be used in a pipe according to the invention.
Figure 21:
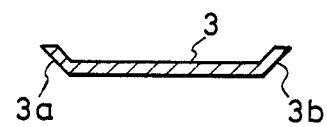
Figure 22:
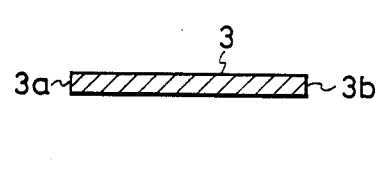
Figure 23:
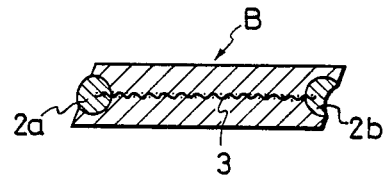
FIG. 23 ia a cross-sectional view of a belt body of an additional embodiment of the invention.

In addition, braids, non-woven cloth, or the like, may be used in place of the cloth. Not only fibrous materials but also materials of metal filaments such as wires may be used as the material for the belt member. Further, a thin metal plate of a material such as steel, stainless steel or the like, or such a thin plate bored with small holes in the form of a punched metal plate may be used as the material for the belt member. In the case of using the belt member made of thin metal plate, the left and right opposite side end portions 3a and 3b of the belt member 3 may be straight, as shown in FIG. 22, or bent in an L-shape, a V-shape, a curled-shape, or the like, as shown in FIGS. 20 and 21. In this way, it is possible to ensure the fixing between the embedded hard resin reinforcing body halves 2a and 2b and the belt member 3 at the opposite side end portions 3a and 3b thereof.

FIGS. 8 and 9 show an embodiment of the pipe A formed such that a belt body B, in which rigid resin reinforcing body halves 2a and 2b are partly projected from the top surface 112 of the belt body B in FIG. 8, is wound to form the pipe A such that the lower surface 111 of the belt body B becomes the inner surface 11 of the pipe A.

In an embodiment shown in FIGS. 10 and 11, a pipe A is formed by a belt body B which is arranged such that rectangularly shaped rigid resin reinforcing body halves 2a and 2b are exposed at the left and right side surfaces and the top surface 112 of the belt body B. In accordance with the embodiments discussed above, the bottom surface 111 of the belt body B corresponds to the inner surface 11 of the pipe A. Further, in the embodiment of FIGS. 10 and 11, the belt body B has a thin film reinforcing belt member 3 embedded therein such that the opposite side end portions 3a and 3b of the belt body B intersect the rigid resin reinforcing body halves 2a and 2b and have left and right outermost edge portions 33a and 33b, respectively, which are slightly projected outwardly from the left and right reinforcing body halves 2a and 2b, respectively. The pipe wall 1 is then formed such that the left outermost edge portion 33a is further disposed in the right rigid resin reinforcing body half 2b of the adjacent winding to the left, as shown in FIG. 11. Similarly, the right outermost edge portion 33b is further disposed in the left body half 2a of the other adjacent winding to the right.

As described above, the way in which the opposite side end portions 3a and 3b of the thin film reinforcing belt member 3 according to the present invention are embedded within the rigid resin reinforcing body halves 2a and 2b is not limited to that shown in the embodiments illustrated in FIGS. 1-9 where the respective outermost edge portions of the belt member 3 are terminated within the reinforcing body halves 2a and 2b, but the opposite side end portions 3a and 3b may be partly projected out of the reinforcing bodies 2a and 2b or alternatively may be terminated just at the respective outer end surfaces of the reinforcing bodies 2a and 2b.

FIGS. 12 and 13 show an embodiment in which a corrugated pipe A having a wavy pipe wall 1 is formed by using a laterally elongated belt body B having a construction similar to that shown in FIG. 2.

The present invention is thus realized by setting the thickness and width of the belt body B and the thickness and the helical angle of the pipe wall 1 as desired, and hence the interval between the embedded reinforcing bodies 2 can be set as desired by the setting of the shape of the belt body B. Further, not only straight pipes as illustrated in the embodiments shown in FIGS. 1-11, but also pipes in which the pipe wall thereof is helically corrugated as shown in FIG. 13 can be manufactured as desired. In addition, the helical corrugations can be realized not only in the form of regular arcuate corrugations, but also in the form of irregular arcuate, square, or triangular corrugations, or the like.

FIGS. 14 and 15 show an embodiment in which it is possible to obtain a pipe A arranged such that portions 1c project toward the inner surface 11 of the pipe wall 1, as shown in FIG. 15, by using a belt body B formed such that, as shown in FIG. 14, the length of each of the rigid resin reinforcing body halves 2a and 2b is made large in the vertical direction between the bottom surface 111 and top surface 112 of the belt body B which corresponds to the radial direction of the finished pipe A. Accordingly, the soft resin portion 1a of the belt body 3 has bulges 1c which project from the lower surface 111 of the belt body B at portions thereof which are directly below the rigid resin reinforcing body halves 2a and 2b. While the vertical or radial length of the reinforcing body halves 2a and 2b is large in this embodiment, it is not always necessary to make the vertical length large.

FIGS. 16 and 17 show another embodiment in which a belt body B is arranged such that, in addition to hard resin reinforcing body halves 2a and 2b formed at left and right ends of the belt body B, respectively, an additional hard synthetic resin reinforcing body 22 is embedded intermediate of the left and right sides of the belt body B, and the thus arranged belt body B is used to form the pipe A in which the rigid synthetic resin reinforcing bodies 2 and 22 are embedded in a pipe wall 1 having roughly twice the pitch between adjacent joints, as shown in FIG. 17, than a pipe body in which the additional reinforcing body 22 is not used. While in this embodiment the position of the additional reinforcing body 22 is shown roughly midway between the reinforcing body halves 2a and 2b, the position of the additional reinforcing body 22 may be close to any one of the rigid resin reinforcing body halves 2a and 2b.

In the same manner, a pipe having triple pitch reinforcing bodies also can be obtained by forming the rigid resin reinforcing bodies 22 at two points in the belt body B between the left and right reinforcing body halves 2a and 2b.

In each of the embodiments described so far, for the sake of convenience, the shape of the outer end surface of each of the rigid resin reinforcing body halves 2a and 2b is illustrated to be linearly divided by a bisector into two symmetrical left and right portions, but the outer end surface of each of the rigid resin reinforcing body halves 2a and 2b may be shaped so as to be reciprocally curved, or partly depressed or projected, or otherwise uneven to increase the area of abutment when the belt body 3 is wound and connected. Further, as shown in FIG. 18, it is possible to obtain a pipe arranged such that the left and right reinforcing body halves 2a and 2b are made circular. In addition, adjacent right and left reinforcing body halves 2b and 2a are disposed close to and in parallel with each other, and such that the pitch between adjacent ones of the reinforcing bodies 2 is twice that of the pitch that would otherwise exist, as shown by a dotted chain line in FIG. 18.

The typical embodiments according to the present invention have been described above. However, the present invention is not limited to only the arrangement of those embodiments, as the invention and those embodiments can be suitably engaged and modified such that the constituent features are still provided, the objects of the present invention are achieved, and the effects as described later are obtained.

Figure 19:
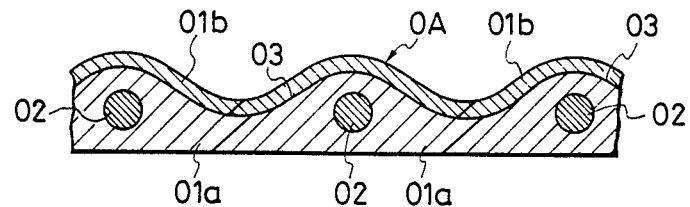
FIG. 19 is a cross-sectional view of a pipe wall of a pressure-withstanding pipe to illustrate a pipe of the type made by conventional means.

As already is apparent from the above description of the present invention, in a conventional pressure-withstanding pipe, in spite of the provision of the hard synthetic resin reinforcing bodies and the thin film reinforcing belt member in the pipe wall, the thickness of the pipe wall at the portion in which the reinforcing body is embedded is unavoidably thicker than the rest of the pipe wall, as shown by the pipe illustrated in FIG. 19. This disadvantage can be eliminated by the present invention because the reinforcing belt member bridges and connects the adjacent hard reinforcing bodies. The pressure-withstanding pipe according to the present invention is advantageous in that it is made possible to manufacture a smooth pipe having a thin and uniform thickness and to reduce the amount of the materials used, and the weight of the entire pipe. In addition, as the reinforcing belt is firmly and securely held at its opposite side end portions by the hard reinforcing bodies, the reaction force of the pipe against any inner pressure exerted by a transported substance is extremely good over the entire circumferential wall of the pipe. Particularly, the interval between adjacent reinforcing bodies can be kept at a predetermined value so as to prevent the pipe from being extended more than necessary or excessively in a longitudinal direction. As a result, there is no risk that the pipe wall will be made thin due to the extension action which could otherwise ultimately cause an exploding phenomenon. Moreover, due to the hard reinforcing bodies, the resultant pipe has superior strength against externally exerted pressure.

The method of manufacturing the pressure-withstanding pipe according to the invention includes a step of extruding an extremely unique belt body from an extruding/molding machine. The unique belt body is arranged such that reinforcing body halves made of hard synthetic resin are embedded in the belt body at the opposite side end portions of the belt body and along the length of the belt body and the opposite side end portions of the reinforcing belt member are embedded in the reinforcing bodies so as to be held therebetween. The method also includes a further step of helically winding the extruded belt body while successively integrally connecting adjacent overlapping or abutting portions of the wound belt body to thereby obtain the pipe. The invention thus has remarkable industrial effects in that it is possible to easily obtain pressure-withstanding pipes which are extremely superior in structure and performance as described above, which can be manufactured easily through mass production, and which are low in cost.

What is claimed is:

1. A method of manufacturing a pressure-withstanding pipe comprising the steps of:
   performing a single extrusion to produce a pipe forming belt body from a first material, a second material harder than said first material, and a belt-like third material, to obtain a belt body having at least first and second reinforcing members of said second material embedded in said first material, with said belt-like third material being embedded in said first material and secured to said first and second reinforcing members so as to form a thin reinforcing layer; and
   helically winding said belt body onto a pipe forming member, so that edges of said belt body are adjacent to one another.

2. A method of manufacturing a pressure-withstanding pipe according to claim 1, wherein said step of forming said pipe from said pipe forming belt body comprises the step of fusing said adjacent edges of said belt body to one another.

3. A method of manufacturing a pressure-withstanding pipe according to claim 2, wherein said first and second reinforcing members have a circular cross-section and are parallel to each other.

4. A method of manufacturing a pressure-withstanding pipe according to claim 2, wherein said steps of winding and fusing are performed immediately after said step of extruding while said adjacent edges of said belt body are still substantially unhardened.

5. A method of manufacturing a pressure-withstanding pipe according to claim 2, wherein said first material is selected from the group consisting of a soft synthetic resin material or a rubber material, and said second material is a synthetic resin material.

6. A method of manufacturing a pressure-withstanding pipe according to claim 5, wherein said thin reinforcing layer is secured to said first and second reinforcing members by embedding first and second opposite side end portions of said thin reinforcing layer in said first and second reinforcing members, respectively.

7. A method of manufacturing a pressure-withstanding pipe according to claim 6, wherein said pipe forming belt body has a first surface facing said pipe forming member in said winding step, and said first and second reinforcing members are embedded in said belt body with at least said first surface of said belt body concealing said first and second reinforcing members.

8. A method of manufacturing a pressure-withstanding pipe according to claim 7, wherein said first and second reinforcing members are embedded within said pipe forming belt body with said belt body substantially completely concealing said first and second reinforcing members.

9. A method of manufacturing a pressure-withstanding pipe according to claim 7, wherein said adjacent edges of said belt body in said winding step are either abutted or overlapped.

10. A method of manufacturing a pressure-withstanding pipe according to claim 7, wherein in said step of extruding, said first and second reinforcing members are embedded close to first and second edges of said belt body, respectively.

11. A method of manufacturing a pressure-withstanding pipe according to claim 10, wherein in said step of extruding said belt body, said first and second reinforcing members are embedded with first and second areas thereof, respectively, exposed at said first and second sides of said belt body, respectively.

12. A method of manufacturing a pressure-withstanding pipe according to claim 11, wherein said step of fusing comprises fusing said first exposed area of said first reinforcing member with the second exposed area of an adjacent second reinforcing member.

13. A method of manufacturing a pressure-withstanding pipe according to claim 12, wherein said first and second exposed areas of said first and second reinforcing members are substantially flat.

14. A method of manufacturing a pressure-withstanding pipe according to claim 12, wherein said first and second exposed ares of said first and second reinforcing members are non-planar and said first exposed area of said first reinforcing member is shaped for receiving the exposed area of said adjacent second reinforcing member.

15. A method of manufacturing a pressure-withstanding pipe according to claim 12, wherein said steps of winding and fusing further include:
   securing said first opposite side end portion of said thin reinforcing belt to said adjacent second reinforcing member; and
   securing said second opposite side end portion of said thin reinforcing belt to an adjacent first reinforcing member,
   whereby said first and second opposite side end portions will be secured to two reinforcing members.

16. A method of manufacturing a pressure-withstanding pipe according to claim 12, wherein a distance between said first and second edges of said belt body is larger than a thickness of said belt body.

* * * * *